United States Patent
Iizuka et al.

(10) Patent No.: US 8,391,172 B2
(45) Date of Patent: Mar. 5, 2013

(54) COMMUNICATION METHOD AND COMMUNICATION TERMINAL FOR RADIO COMMUNICATION SYSTEM

(75) Inventors: Yousuke Iizuka, Yokosuka (JP); Masato Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 418 days.

(21) Appl. No.: 12/761,794

(22) Filed: Apr. 16, 2010

(65) Prior Publication Data

US 2010/0271969 A1 Oct. 28, 2010

(30) Foreign Application Priority Data

Apr. 27, 2009 (JP) ................. 2009-108519

(51) Int. Cl.
H04W 72/04 (2009.01)

(52) U.S. Cl. ........ 370/252; 370/311; 370/329; 370/342; 455/522

(58) Field of Classification Search .......... None
See application file for complete search history.

(56) References Cited

U.S. PATENT DOCUMENTS

| | | | | |
|---|---|---|---|---|
| 2007/0030838 A1* | 2/2007 | Kaikkonen et al. | ........... | 370/342 |
| 2007/0076641 A1* | 4/2007 | Bachl et al. | ................... | 370/310 |
| 2009/0052403 A1 | 2/2009 | Hokao | ........................... | 370/335 |
| 2009/0312073 A1* | 12/2009 | Park et al. | ..................... | 455/574 |
| 2010/0267413 A1* | 10/2010 | Iizuka et al. | ................. | 455/522 |

FOREIGN PATENT DOCUMENTS

| | | |
|---|---|---|
| EP | 1 306 982 A1 | 5/2003 |
| EP | 1 758 265 A1 | 2/2007 |
| JP | 2006-186404 | 7/2006 |
| JP | 2007-228092 | 9/2007 |
| JP | 2008-5073 | 1/2008 |
| JP | 2008-541646 | 11/2008 |
| JP | 2010-514339 | 4/2010 |
| WO | WO 2006/100994 A1 | 9/2006 |

OTHER PUBLICATIONS

3GPP TS 25.214 V6.9.0 (Jun. 2006); Technical Specification, 3rd Generation Partnership Project; Technical Specification Group Radio Access Network; Physical layer procedures (FDD), (Release 6), Jun. 2006, 59 pages.

Search Report issued Apr. 20, 2011 in European Patent Application No. 10250800.9-2411/2247148.

Office Action issued Mar. 29, 2011, in Japanese Patent Application No. 2009-108519 (with English-language translation).

* cited by examiner

*Primary Examiner* — Chi H. Pham
*Assistant Examiner* — Shick Hom
(74) *Attorney, Agent, or Firm* — Oblon, Spivak, McClelland, Maier & Neustadt, L.L.P.

(57) ABSTRACT

A communication method for a radio communication system employing an enhanced uplink scheme includes the steps of determining a transmission power control bit for controlling transmission power of a downlink control channel; generating an uplink control signal including the transmission power control bit; and transmitting the uplink control signal to a base station. In the determining step, whether an indicator channel indicating acknowledgement or negative acknowledgement for an uplink data channel is receivable at a quality level better than a predetermined value is evaluated, and the transmission power control bit of the indicator channel is determined based on the evaluation result.

6 Claims, 16 Drawing Sheets

COMMUNICATION METHOD AND COMMUNICATION TERMINAL FOR RADIO COMMUNICATION SYSTEM

BACKGROUND OF THE INVENTION

1. Field of the Invention

A certain aspect of the present invention relates to a communication method and a communication terminal for a radio communication system.

2. Description of the Related Art

Because of rapid spread of the Internet, increase in the number of information sources, increase in the volume of information, and development of the next-generation Internet in these years, research and development in next-generation radio access schemes have become very active to realize high-speed radio transmission in mobile communications. In such a high-speed radio environment, it is important to increase the uplink speed in addition to the downlink speed. For this purpose, an enhanced uplink scheme, a technology for increasing the uplink speed, has been defined by the 3rd Generation Partnership Project (3GPP), a standardization group.

FIG. 1 shows a related-art communication system employing wideband code division multiple access (W-CDMA). The communication system includes one or more communication terminals and one or more base stations. A communication terminal in W-CDMA measures a packet error rate using cyclic redundancy check (CRC) bits attached to a received downlink signal. Downlink transmission power is controlled such that a constant error rate (e.g., 0.5%) is achieved. Such a control method is called outer loop transmission power control (TPC).

FIG. 2 shows an exemplary process at a communication terminal according to the outer loop TCP.

In step S1 shown in FIG. 2, the communication terminal measures a packet error rate of a received dedicated physical channel (DPCH) based on CRC bits of the DPCH.

In step S2, the communication terminal determines whether the packet error rate is less (better) than or equal to a predetermined value (e.g., 10%). If the packet error rate is less than or equal to the predetermined value, the process proceeds to step S3. If the packet error rate is greater (worse) than the predetermined value, the process proceeds to step S4.

In step S3, because the error rate is less than or equal to the predetermined value, the communication terminal sets a transmission power control bit for the downlink transmission power of the DPCH to indicate that the transmission power needs to be decreased.

In step S4, because the error rate is greater than the predetermined value, the communication terminal sets the transmission power control bit for the downlink transmission power of the DPCH to indicate that the transmission power needs to be increased.

In step S5, the communication terminal transmits an uplink control signal including the transmission power control bit set in step S3 or S4 to the base station. Then, the base station increases or decreases the downlink transmission power according to the transmission power control bit and transmits a downlink signal (DPCH) with the increased or decreased transmission power. This kind of technology is disclosed, for example, in 3GPP TS25.214 V6.9.0.

In a radio communication system employing the enhanced uplink scheme, each communication terminal transmits data via a radio communication channel called an enhanced-dedicated physical data channel (E-DPDCH). The base station measures the interference level of the F-DPCH from each communication terminal and determines the maximum allowable level of uplink transmission power of the communication terminal based on the measured interference level to improve the throughput. Also in a radio communication system employing the enhanced uplink scheme, hybrid automatic repeat request (HARQ) is used for retransmission and combining of packets. To properly perform throughput control and HARQ control, a greater number of channels of different types are provided in a radio communication system employing the enhanced uplink scheme than in a radio communication system employing W-CDMA. The channels used in a radio communication system employing the enhanced uplink scheme may or may not include CRC bits. The transmission power of a channel with CRC bits can be properly controlled, for example, by a method as described with reference to FIG. 2. However, the outer loop TPC as shown by FIG. 2 cannot be applied without change to a channel without CRC bits (particularly, a downlink control channel described later). Theoretically, it is possible to attach CRC bits to all downlink control channels for which transmission power control is performed. However, such an approach may greatly reduce radio resources for downlink data channels.

For the above reasons, there is a demand for a device and a method that make it possible to properly control the transmission power of a downlink control channel not including CRC bits without greatly reducing radio resources for downlink data channels.

SUMMARY OF THE INVENTION

An aspect of the present invention provides a communication method for a radio communication system employing an enhanced uplink scheme. The communication method includes the steps of determining a transmission power control bit for controlling transmission power of a downlink control channel; generating an uplink control signal including the transmission power control bit; and transmitting the uplink control signal to a base station. In the determining step, whether an indicator channel indicating acknowledgement or negative acknowledgement for an uplink data channel is receivable at a quality level better than a predetermined value is evaluated, and the transmission power control bit of the indicator channel is determined based on the evaluation result.

Another aspect of the present invention provides a communication terminal for a radio communication system employing an enhanced uplink scheme. The communication terminal includes a determining unit configured to determine a transmission power control bit for controlling transmission power of a downlink control channel; a generating unit configured to generate an uplink control signal including the transmission power control bit; and a transmitting unit configured to transmit the uplink control signal to a base station. The determining unit is configured to evaluate whether an indicator channel indicating acknowledgement or negative acknowledgement for an uplink data channel is receivable at a quality level better than a predetermined value, and to determine the transmission power control bit of the indicator channel based on the evaluation result.

DESCRIPTION OF THE PREFERRED EMBODIMENTS

Figure 1:
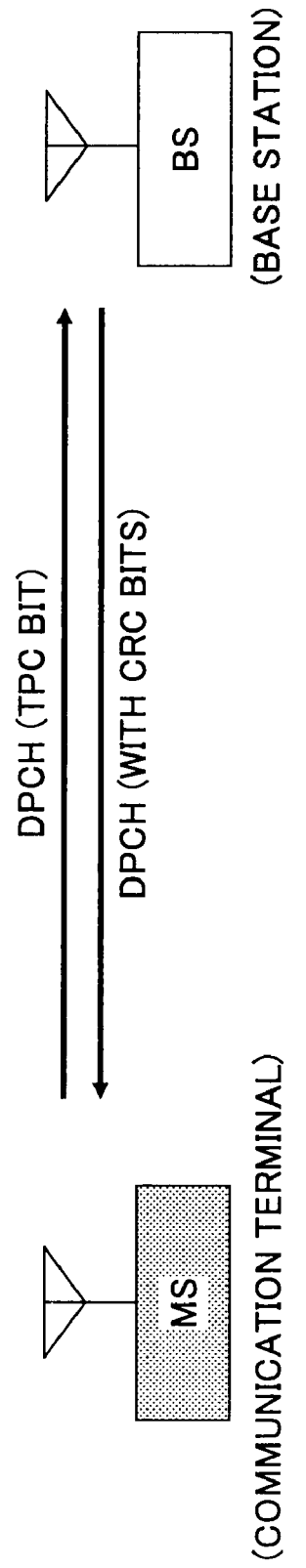
FIG. 1 is a schematic diagram of a radio communication system.
Figure 2:
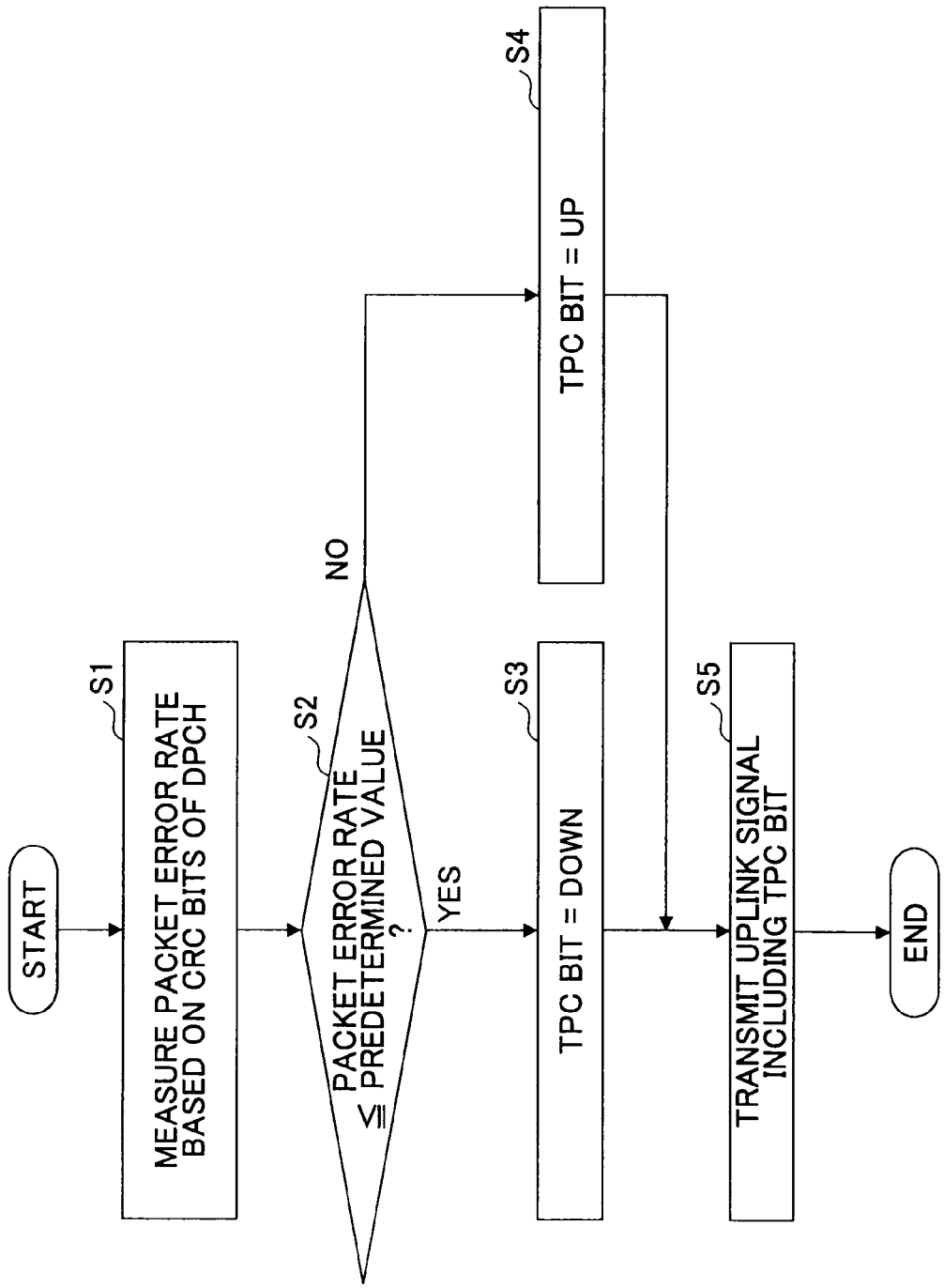
FIG. 2 is a flowchart showing an outer loop transmission power control process.

An aspect of the present invention makes it possible to properly control downlink transmission power of a downlink control channel including no error detection bit.

(1) A communication method (performed by a communication terminal) according to an aspect of the present invention is used for a radio communication system employing the enhanced uplink scheme. The communication method includes the steps of evaluating whether an indicator channel (E-HICH) indicating acknowledgement or negative acknowledgement for an uplink data channel is receivable at a quality level better than a predetermined value and determining a transmission power control (TPC) bit of the indicator channel based on the evaluation result.

More specifically, transmission power control for a downlink control channel without cyclic redundancy check (CRC) bits is performed using one or more of a bit error rate of a CPICH, an error rate of a downlink HS-SCCH, an error rate of an HS-PDSCH, and a detection result of an E-HICH. This method makes it possible to perform outer loop transmission power control without attaching CRC bits to all downlink control channels and thereby makes it possible to maintain the quality of the downlink control channels.

(2) The communication method may further include the steps of measuring the reception quality (BER) of a pilot channel (CPICH), and estimating the reception quality of an indicator channel (E-HICH) based on the measured reception quality (BER) of the pilot channel and a known relationship between the reception quality (BER) of the pilot channel and the reception quality (PER) of the indicator channel (E-HICH). In the determining step, whether the indicator channel (E-HICH) is receivable at the quality level better than the predetermined value is determined based on the estimated reception quality of the indicator channel.

This method is preferable, for example, to perform transmission power control of the E-HICH on regular basis.

(3) The communication method may further include the step of measuring the received power and the reception quality of a downlink channel (HS-SCCH, HS-PDSCH) including error detection bits (CRC bits). In the determining step, whether to increase the transmission power of the indicator channel (E-HICH) is determined based on the measured received power and reception quality of the downlink channel and a known relationship between the received power and the reception quality of the downlink channel.

This method makes it possible to accurately perform transmission power control of the E-HICH based on an accurate reception quality measurement such as a bit error rate and a packet error rate.

(4) In the determining step of the communication method, whether to increase the transmission power of the indicator channel (E-HICH) may be determined based on whether the measured reception quality of the downlink channel is within a predetermined range (area (1)*area (Q)). According to the known relationship, the predetermined range (area (1)*area (Q)) becomes wider as the received power of the downlink channel becomes lower.

If the reception quality is out of the predetermined range (for example, in area (2)*area (Q)), the transmission power is not increased but is decreased even when the reception quality is low. This method is preferable to increase the system throughput while efficiently using transmission power resources of the base station.

(5) The relationship between the transmission power control (TPC) bit of the indicator channel (E-HICH) and TPC bits of other control channels (e.g., E-AGCH, E-RGCH, and F-DPCH) without CRC bits may be known in advance. This method is preferable to reduce the number of information bits to be transmitted via an uplink signal.

The following aspects of the present invention are described below as preferred embodiments:

1. System
2. Transmission power control based on bit error rate of CPICH
3. Transmission power control based on error rate of HS-SCCH
4. Transmission power control based on error rate of HS-PDSCH
5. Transmission power control based on detection result of E-HICH
6. Communication terminal
7. Base station
8. Variations

FIRST EMBODIMENT

1. System

Figure 3:
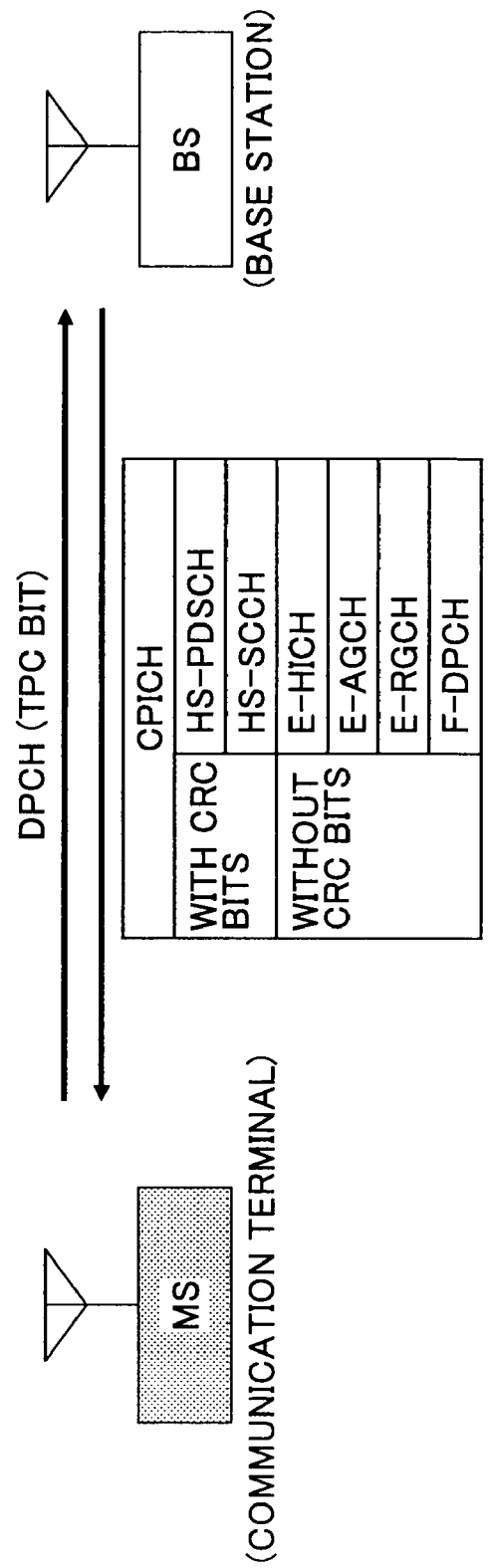
FIG. 3 is a schematic diagram of a radio communication system according to an embodiment of the present invention.

FIG. 3 shows a radio communication system according to an embodiment of the present invention. The radio communication system is, for example, a mobile communication system employing the enhanced uplink scheme. As shown in FIG. 3, the radio communication system includes a base station (BS) and a communication terminal (MS) communicating via the base station. The radio communication system may include any number of base stations and communication terminals. The communication terminal is a user device such as a mobile terminal or a fixed terminal. As described above, in a radio communication system employing the enhanced uplink scheme, various channels are transmitted and received between the communication terminal and the base station.

Communication channels with particular relevance to this embodiment are briefly described below. For details of those communication channels, see, for example, 3GPP 25.211 v6.9.0 (2007-11).

○ Uplink Dedicated Physical Channel (Uplink DPCH)

The uplink DPCH is used to transmit a transmission power control (TPC) bit from the communication terminal to the base station. Cyclic redundancy check (CRC) bits are attached to the uplink DPCH.

●Common Pilot Channel (CPICH)

The CPICH is transmitted from the base station to the communication terminal and is used, for example, by the communication terminal to measure the radio field intensity and to perform channel compensation. The signal content to be transmitted by the CPICH is known both to the base station and the communication terminal. The CPICH is transmitted with a constant power level. CRC bits are not attached to the CPICH.

○ High-Speed Physical Downlink Shared Channel (HS-PDSCH)

The HS-PDSCH is a data channel for high-speed downlink communications. CRC bits are attached to the HS-PDSCH.

○ High-Speed Shared Control Channel (HS-SCCH)

The HS-SCCH is a control channel for high-speed downlink communications and includes information necessary for receiving the HS-PDSCH. CRC bits are attached to the HS-SCCH.

● Enhanced-Dedicated Channel Hybrid ARQ Indicator Channel (E-HICH)

The E-HICH is used to transmit acknowledgement information from the base station to the communication terminal. The acknowledgement information indicates either acknowledgement (ACK) or negative acknowledgement (NACK). The E-HICH is transmitted after a predetermined period of time from when a corresponding uplink data channel is transmitted. CRC bits are not attached to the E-HICH.

● E-DCH Absolute Grant Channel (E-AGCH)

The E-AGCH is used to report an allowable transmission power level to the communication terminal from the base station communicating with the communication terminal. CRC bits are not attached to the E-AGCH.

● E-DCH Relative Grant Channel (E-RGCH)

The E-RGCH is used to report an allowable transmission power level to the communication terminal from a base station not communicating with the communication terminal. CRC bits are not attached to the E-RGCH.

● Fractional Dedicated Physical Channel (F-DPCH)

The F-DPCH is used to transmit a transmission power control (TPC) bit from the base station to the communication terminal. The CRC bits are not attached to the F-DPCH.

The communication terminal can measure bit error rates of signals indicated by ○ which include CRC bits. Therefore, outer loop transmission power control can be performed on those signals to keep their bit error rates at certain levels. However, the communication terminal cannot measure error rates of signals (E-HICH, E-AGCH, E-RGCH, and F-DPCH) indicated by ● which do not include CRC bits. Therefore, it is difficult to apply outer loop transmission power control of the related art to those signals.

Below, transmission power control methods applicable to signals without CRC bits are described.

2. Transmission Power Control Based on Bit Error Rate of CPICH

As described above, the common pilot channel (CPICH) does not include CRC bits, but its signal content is known both to the base station and the communication terminal. Also, the CPICH is transmitted with a constant power level. Therefore, the communication terminal can measure the bit error rate of a received CPICH. The bit error rate reflects the quality of downlink channels and therefore can be used for transmission power control of a downlink channel such as the E-HICH.

In the transmission power control method described below, the quality of the E-HICH (E-AGCH, E-RGCH, or F-DPCH) is estimated based on the bit error rate of the CPICH to control transmission power of the E-HICH (E-AGCH, E-RGCH, or F-DPCH).

Figure 4:
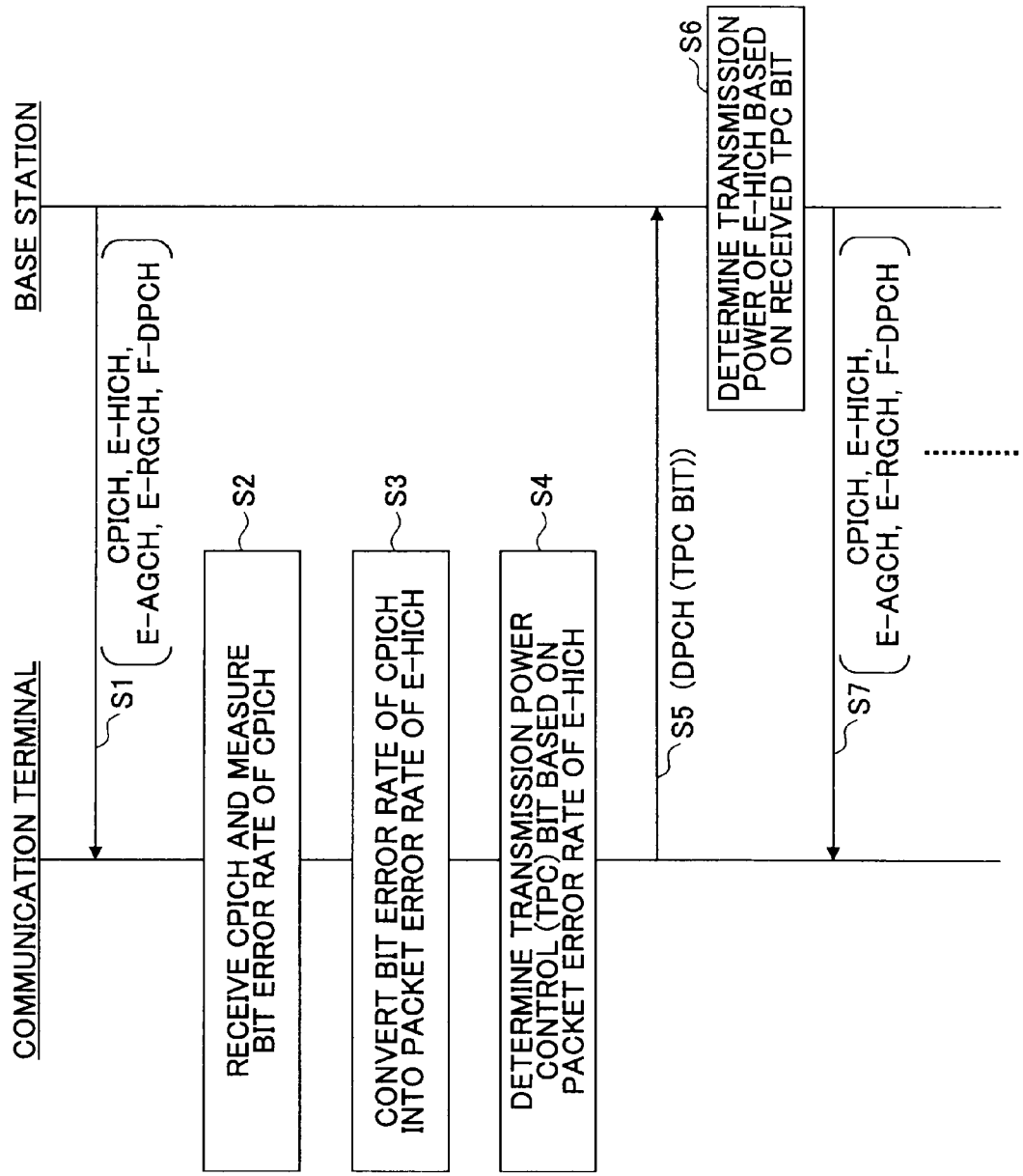
FIG. 4 is a sequence chart showing a transmission power control method using a CPICH.

FIG. 4 shows an exemplary transmission power control method based on the bit error rate of the CPICH.

In step S1 shown in FIG. 4, the base station transmits various downlink channels to the communication terminal. However, it is not necessary to transmit all channels shown in FIG. 4 in step S1. In this exemplary method, at least the CPICH is necessary.

In step S2, the communication terminal receives the CPICH and measures the bit error rate of the received CPICH.

In step S3, the communication terminal converts the bit error rate of the CPICH into a quality level of another channel without CRC bits (i.e., estimates the quality level of another channel). Examples of channels without CRC bits include the E-HICH, the E-AGCH, the E-RGCH, and the F-DPCH. The quality level may be represented, for example, by a bit error rate, a packet error rate, field intensity, SIR, or Ec/No. Here, it is assumed that the packet error rate of the E-HICH is estimated based on the bit error rate of the CPICH. The relationship between the quality level of the CPICH and the quality level of the E-HICH (or any other channel without CRC bits) can be studied in advance. Information on the relationship may be provided as broadcast information common to the entire system or provided for each communication terminal.

Figure 5:
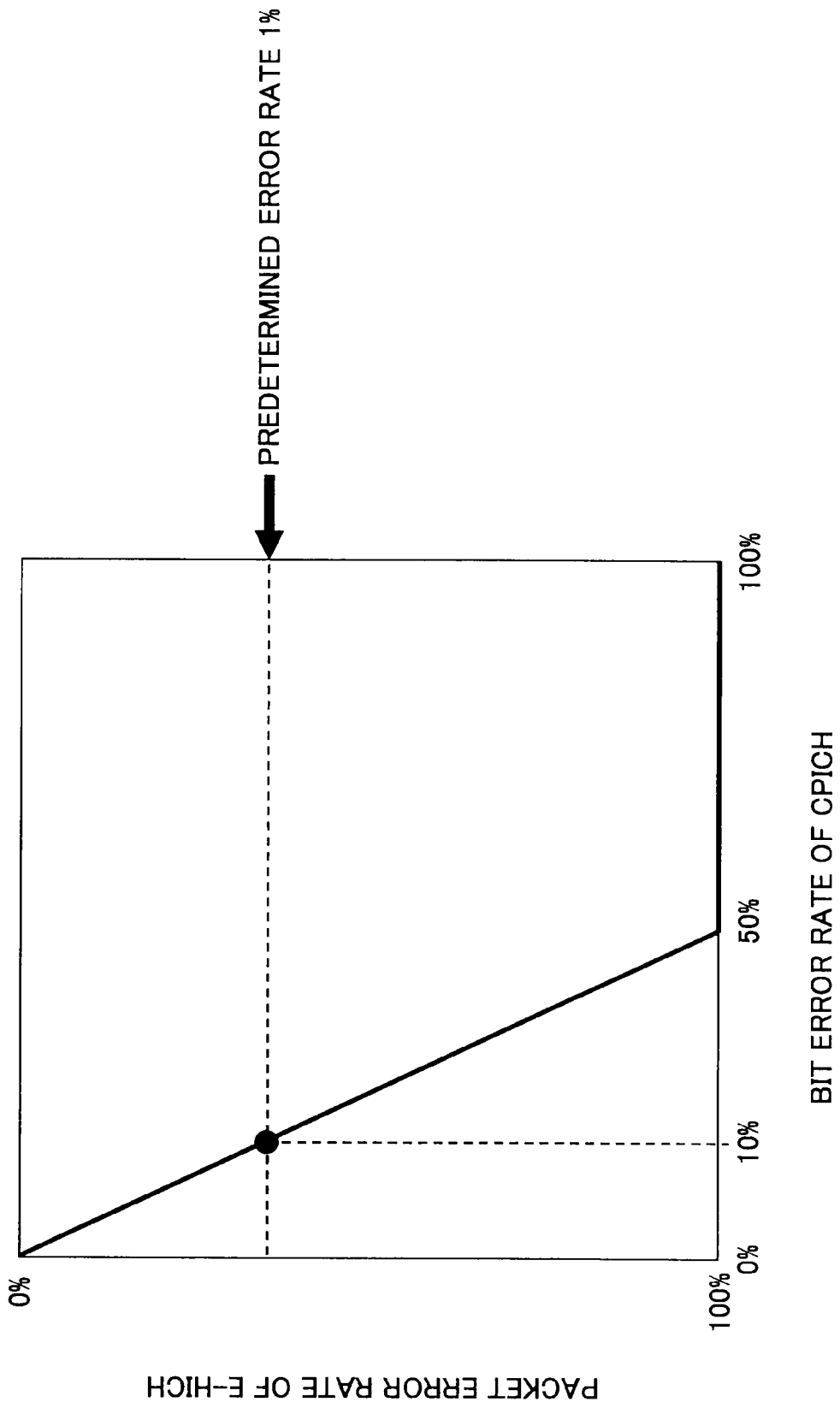
FIG. 5 is a graph showing a relationship between a bit error rate of a CPICH and a packet error rate of an E-HICH.

FIG. 5 is a graph showing an exemplary relationship between the bit error rate of the CPICH and the packet error rate of the E-HICH. In this example, when the bit error rate of the CPICH is 10%, the packet error rate of the E-HICH is 1%. These values are just examples and may vary depending on conditions. The E-HICH represents either acknowledgement (ACK) or negative acknowledgement (NACK) and can be basically represented by one bit. Therefore, if the bit error rate of the CPICH is as high as 50%, the packet error rate of the E-HICH becomes 100%.

In step S4 of FIG. 4, the communication terminal determines the transmission power control (TPC) bit for downlink transmission power of the E-HICH based on the packet error rate of the E-HICH estimated in step S3.

Figure 6:
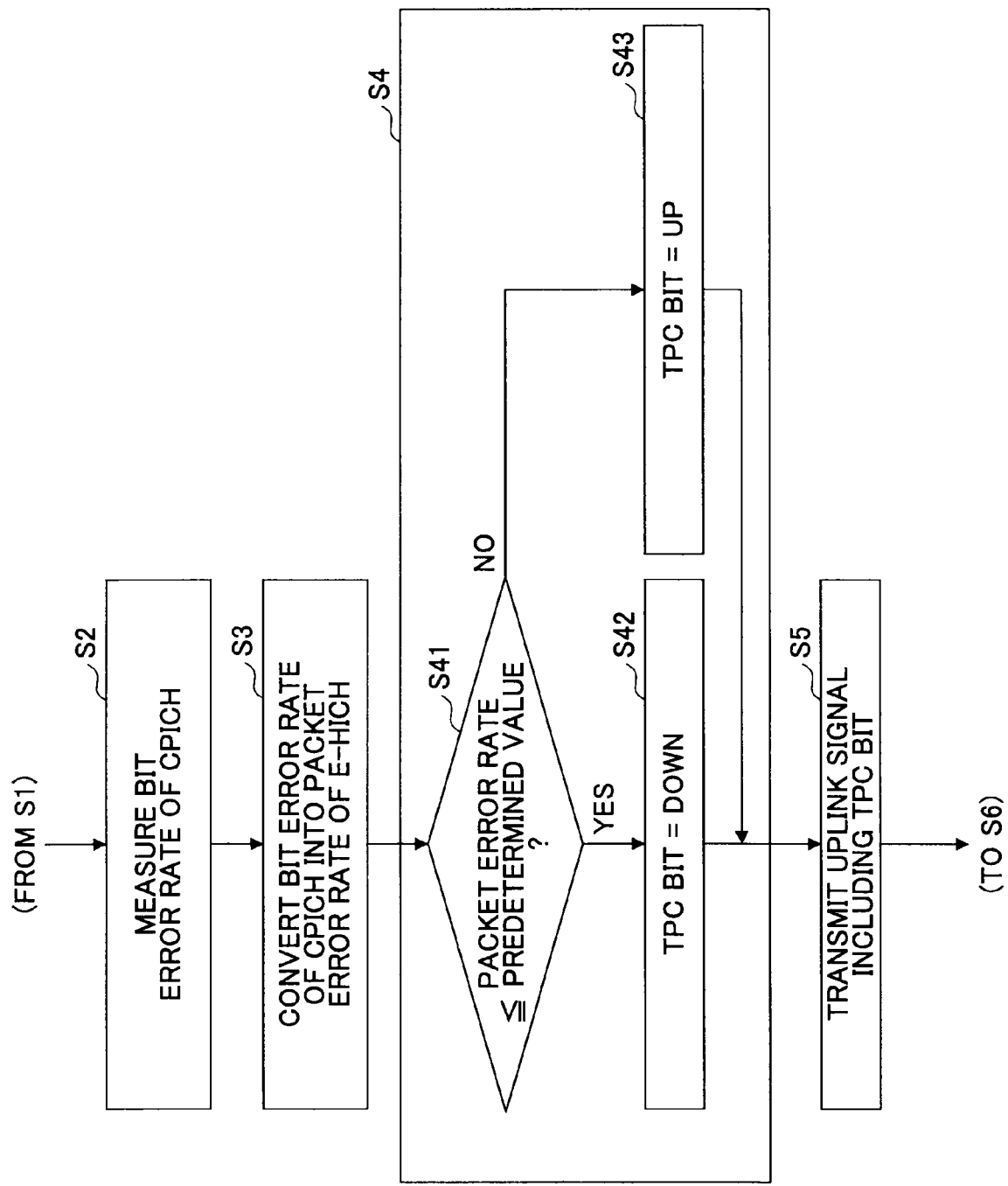
FIG. 6 is a flowchart showing details of step S4 of FIG. 4.

FIG. 6 is a flowchart showing details of step S4 of FIG. 4.

In step S41, the communication terminal determines whether the packet error rate of the E-HICH estimated in step S3 is less (better) than or equal to a predetermined value. The predetermined value is, for example, set at 1% that corresponds to a bit error rate of 10% in the CPICH. If the packet error rate is less (better) than or equal to the predetermined value, the process proceeds to step S42. If the packet error rate is greater (worse) than the predetermined value, the process proceeds to step S43.

In step S42, the communication terminal sets the transmission power control (TPC) bit to indicate that the downlink transmission power needs to be decreased.

Meanwhile, in step S43, the communication terminal sets the transmission power control (TPC) bit to indicate that the downlink transmission power needs to be increased.

After step S42 or S43, the process proceeds to step S5.

In step S5 shown in FIGS. 4 and 6, the communication terminal transmits an uplink signal (DPCH) including the transmission power control (TPC) bit set in step S4.

In step S6 shown in FIG. 4, the base station receives the uplink signal from the communication terminal, extracts the transmission power control (TPC) bit from the received uplink signal, and determines the transmission power of the E-HICH according to the TPC bit.

In step S7, the base station transmits the E-HICH with the determined transmission power.

Transmission power of other channels (E-AGCH, E-RGCH, and F-DPCH) without CRC bits may also be determined in a manner similar to the E-HICH. For example, in addition to the TPC bit of the E-HICH, a TPC bit of the E-AGCH may be determined based on a relationship between the bit error rate of the CPICH and the quality level of the E-AGCH. In this case, the DPCH to be transmitted from the communication terminal to the base station may include one or more TPC bits of the E-HICH, the E-AGCH, the E-RGCH, and the F-DPCH.

Alternatively, transmission power of other channels (E-AGCH, E-RGCH, and F-DPCH) without CRC bits may be determined based on a predetermined relationship between the TPC bit of the E-HICH and TPC bits of the other channels. For example, a relationship between the transmission power (or quality level) of the E-HICH and transmission power (or quality levels) of other channels (E-AGCH, E-RGCH, and F-DPCH) may be stored in advance in the communication terminal and the base station. In this case, the DPCH to be transmitted from the communication terminal to the base station may include only the TPC bit of the E-HICH.

The E-HICH represents acknowledgement (ACK) or negative acknowledgement (NACK) for a previously transmitted uplink data channel and is essential information for retransmission control. The communication terminal transmits a new packet or a retransmission packet of the E-DPDCH based on whether the E-HICH indicates acknowledgement or negative acknowledgement. Therefore, the quality of the E-HICH greatly influences the throughput. For this reason, it is preferable to perform transmission power control for channels without CRC bits based on the quality of the E-HICH to efficiently perform high-speed communications.

3. Transmission Power Control Based on Error Rate of HS-SCCH

When transmitting a downlink data channel in a system employing the enhanced uplink scheme for uplink communications, the base station transmits the downlink data channel together with a high-speed shared control channel (HS-SCCH). Since CRC bits are attached to the HS-SCCH, the error rate of the HS-SCCH can be measured based on the CRC bits. The error rate reflects the quality of downlink channels and therefore can be used for transmission power control of a downlink channel such as the E-HICH. However, unlike the CPICH, the transmission power of the HS-SCCH is not constant. Therefore, when estimating the error rate at the communication terminal, it is necessary to take into account the received power of the HS-SCCH.

In the transmission power control method described below, transmission power of a downlink channel such as the E-HICH is controlled based on the error rate of the HS-SCCH.

Figure 7:
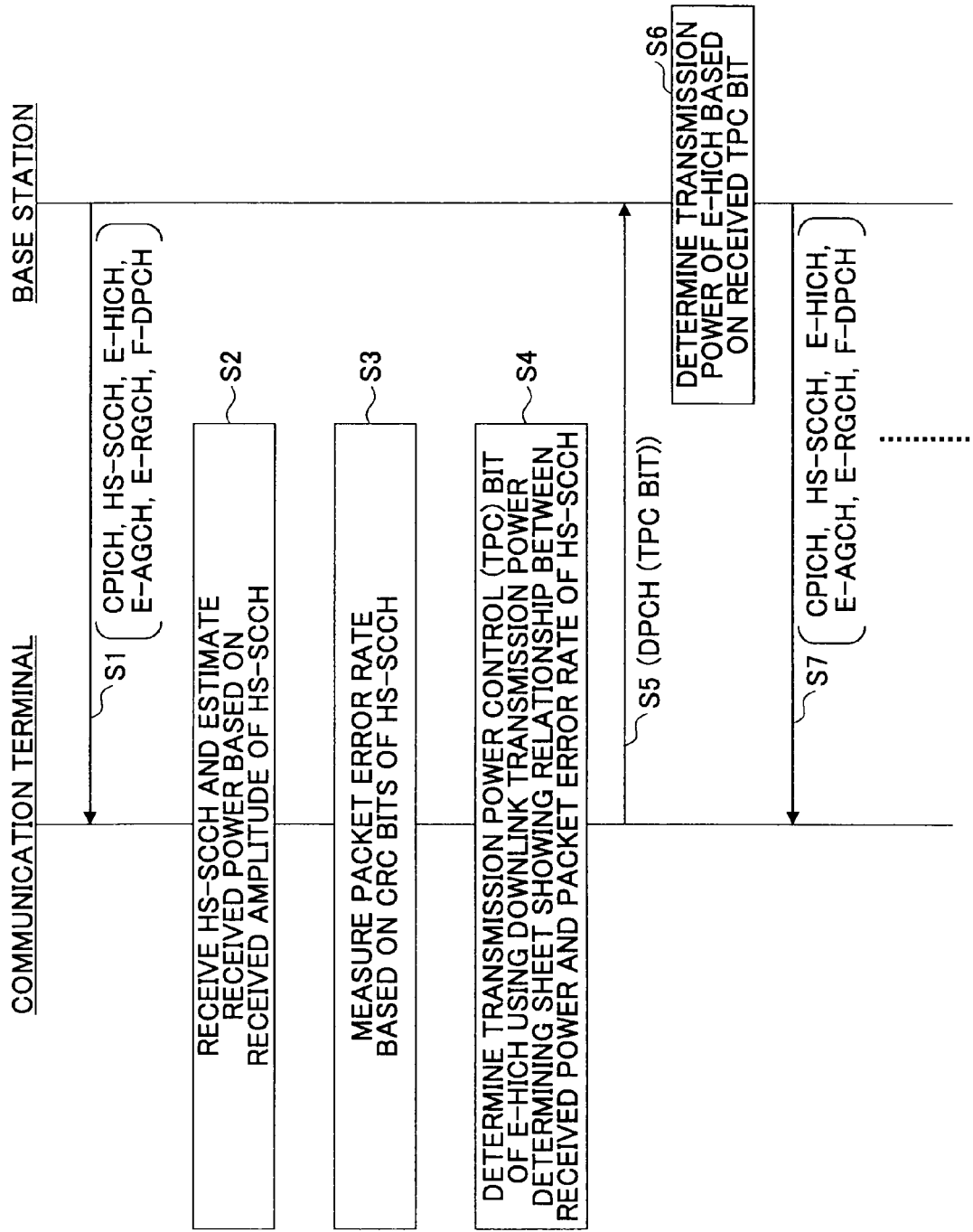
FIG. 7 is a sequence chart showing a transmission power control method using an HS-SCCH.

FIG. 7 shows a transmission power control method based on an error rate of the HS-SCCH.

In step S1 shown in FIG. 7, the base station transmits various downlink channels to the communication terminal. However, it is not necessary to transmit all channels shown in FIG. 7 in step S1. In this exemplary method, at least the high-speed shared control channel (HS-SCCH) and the high-speed physical downlink shared channel (HS-PDSCH) are necessary.

In step S2, the communication terminal receives the HS-SCCH, measures the received amplitude of the HS-SCCH, and estimates the received power of the HS-SCCH based on the measured received amplitude. Since the number of multiplexed codes (one code) and the data modulation scheme (QPSK) of the HS-SCCH are known, the communication terminal can estimate the received power based on the received amplitude.

In step S3, the communication terminal measures an error rate based on the CRC bits of the HS-SCCH. The error rate may be represented by any appropriate indicator such as a bit error rate, a packet error rate, or a block error rate. For descriptive purposes, it is assumed that a packet error rate is measured in step S3.

Steps S2 and S3 may be performed in the order as shown in FIG. 7 or a part or the whole of step S3 may be performed concurrently with step S2.

In step S4, the communication terminal determines an area in a downlink transmission power determining sheet based on the received power and the packet error rate of the HS-SCCH measured in steps S2 and S3. The communication terminal also determines the transmission power control (TPC) bit of the E-HICH according to the determined area.

Figure 8:
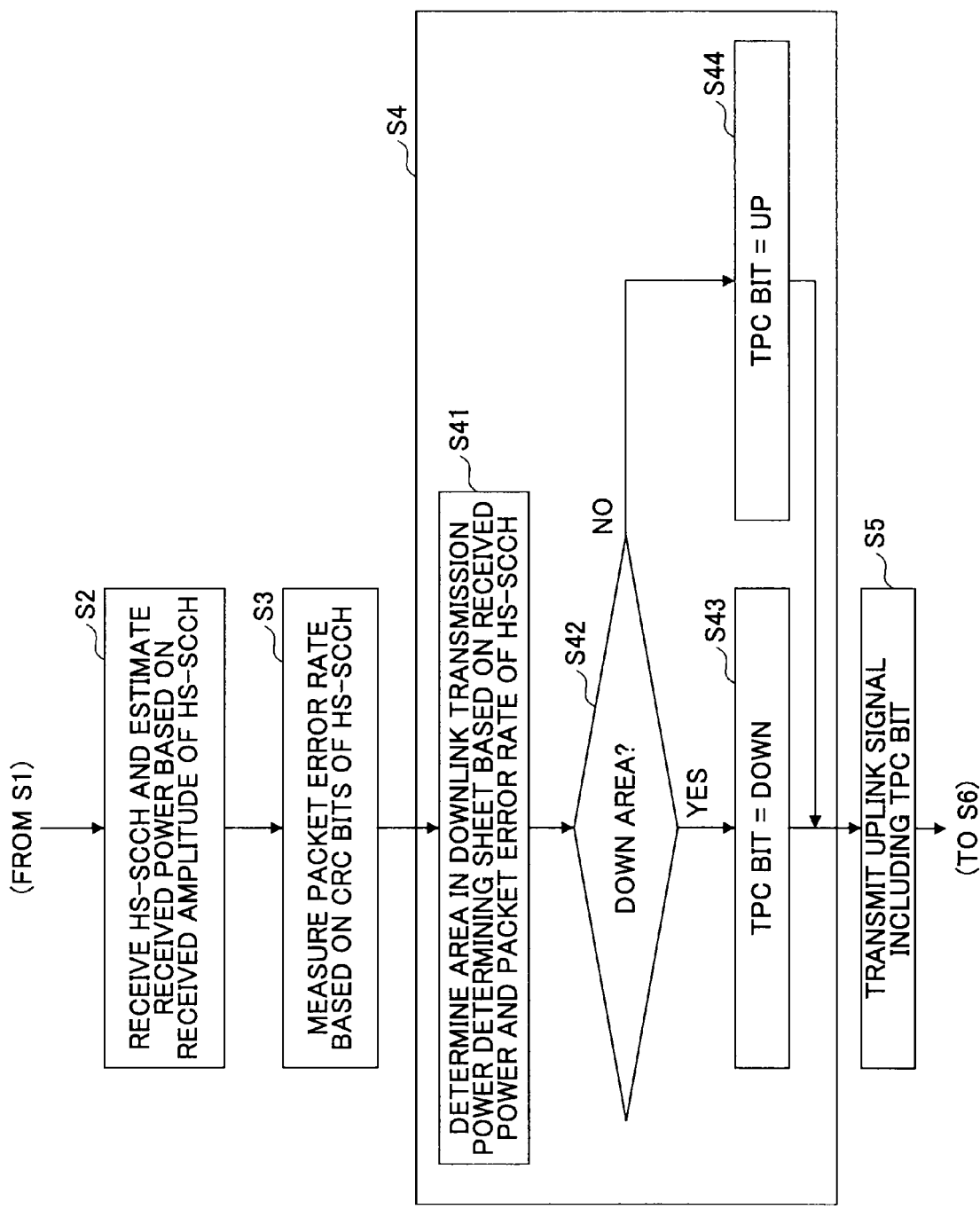
FIG. 8 is a flowchart showing details of step S4 of FIG. 7.

FIG. 8 is a flowchart showing details of step S4 of FIG. 7.

In step S41, the communication terminal determines an area in the downlink transmission power determining sheet based on the measured received power and packet error rate of the HS-SCCH.

Figure 9:
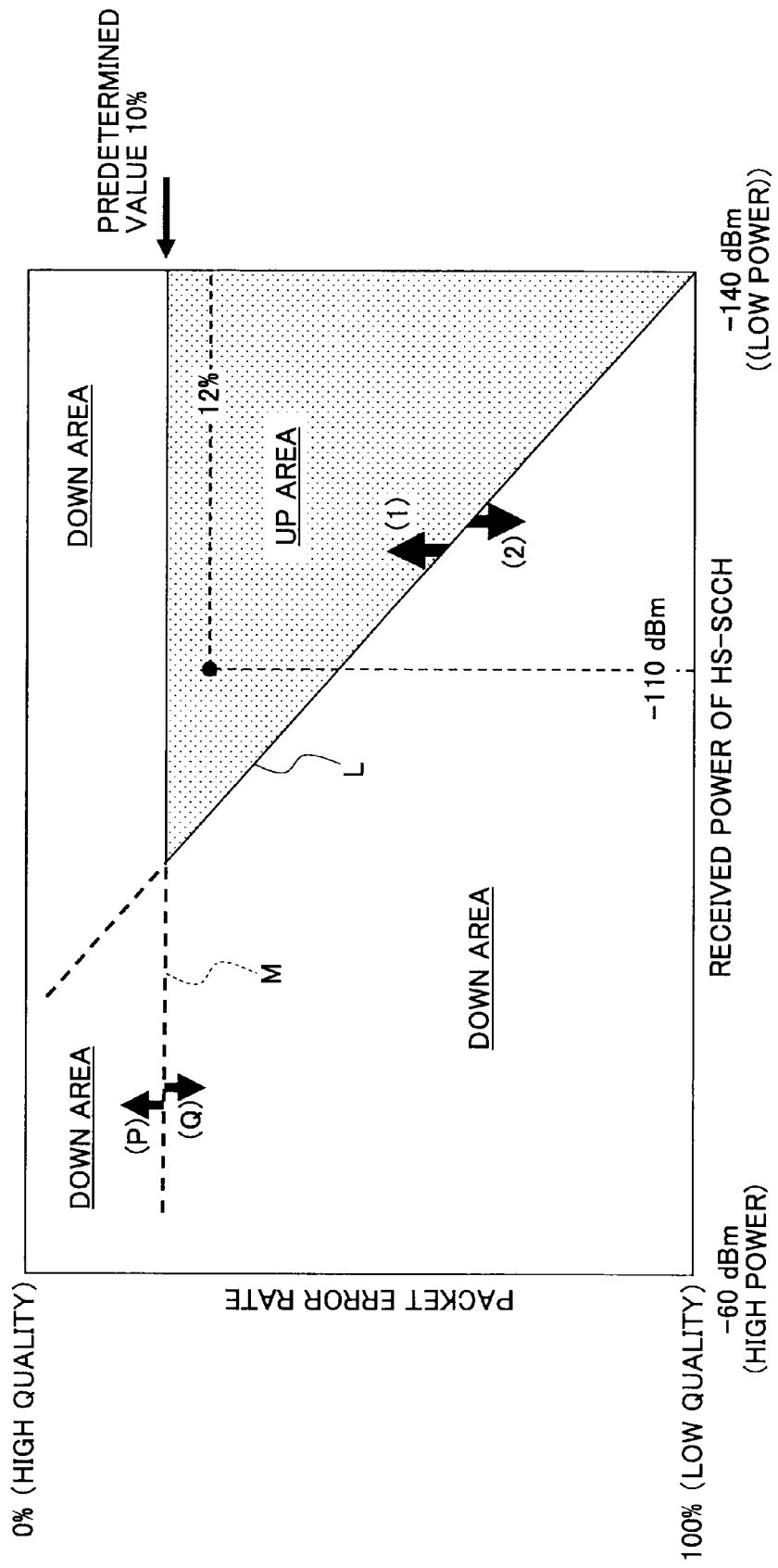
FIG. 9 is a drawing illustrating an example of a downlink transmission power determining sheet.

FIG. 9 shows an example of the downlink transmission power determining sheet. The downlink transmission power determining sheet is, for example, stored in a memory of the communication terminal in advance. Information on the downlink transmission power determining sheet may be provided as system broadcast information or provided for each communication terminal. The downlink transmission power determining sheet is used to determine whether to increase the transmission power of the E-HICH based on the measured received power and packet error rate of the HS-SCCH. The downlink transmission power determining sheet is a two-dimensional distribution chart (graph) showing a relationship between the received power and the packet error rate of the HS-SCCH, which reflects a relationship between the received power and the packet error rate of the E-HICH, in association with increase and decrease of the downlink transmission power of the E-HICH. There is a one-to-one relationship between the packet error rate of the HS-SCCH and the packet error rate of the E-HICH and the relationship can be studied in advance. For example, a packet error rate of 10% in the HS-SCCH corresponds to a packet error rate of 1% in the E-HICH.

In general, when the measured packet error rate of the HS-SCCH is less (better) than a predetermined value (e.g., 10%), i.e., belongs to an area (P), it indicates that the reception environment of the communication terminal is excessively good. To efficiently use downlink power resources, it is preferable to decrease the downlink transmission power for the communication terminal when the packet error rate is in the area (P) (when the reception environment is excessively good) and to use the power obtained by decreasing the downlink transmission power for other communication terminals. For this reason, when the measured packet error rate is in the area (P), the TPC bit is set to indicate that the downlink transmission power needs to be decreased. In FIG. 9, to illustrate this approach, the area (P) corresponding to quality levels better than the predetermined value indicated by a line M is labeled as "Down Area".

Meanwhile, there is generally a relationship as indicated by a line L between the received power of the HS-SCCH and the packet error rate of the HS-SCCH. Although the line L is exemplified by a straight line in FIG. 9, the line L may take various shapes. When the measured packet error rate is above the line L, i.e., belongs to an area (1), it indicates that the reception environment of the communication terminal is better than average. When the measured packet error rate is greater (worse) than the predetermined value under such an environment, it may be possible to improve the packet error rate by increasing the downlink transmission power. For this reason, when a coordinate point defined by the measured received power and packet error rate of the HS-SCCH belongs to an overlapping area between an area (Q) below the line M and the area (1) above the line L, the TPC bit is set to indicate that the downlink transmission power needs to be increased. In FIG. 9, to illustrate this approach, the overlapping area between the area (Q) and the area (1) is labeled as "Up Area".

When the measured packet error rate is below the line L, i.e., belongs to an area (2), it indicates that the reception environment of the communication terminal is worse than average. When the measured packet error rate is greater (worse) than the predetermined value under such an environment, it may be necessary to greatly increase the downlink transmission power to improve the packet error rate. In other words, compared with an average reception environment, higher transmission power is necessary to improve the packet error rate. Providing high transmission power for a communication terminal in such a bad reception environment is not preferable for the purpose of efficiently using power resources while improving the system throughput. For this reason, when a coordinate point defined by the measured received power and packet error rate of the HS-SCCH belongs to an overlapping area between the area (Q) below the line M and the area (2) below the line L, the TPC bit is set to indicate that the downlink transmission power needs to be decreased. In FIG. 9, to illustrate this approach, the overlapping area between the area (Q) and the area (2) is labeled as "Down Area".

In step S42 of FIG. 8, the communication terminal determines whether a coordinate point defined by the received power and the packet error rate of the HS-SCCH measured in steps S2 and S3 belongs to the "Down Area" in the downlink transmission power determining sheet shown in FIG. 9. If the coordinate point belongs to the "Down Area", the process proceeds to step S43. If the coordinate point does not belong to the "Down Area", i.e., if the coordinate point belongs to the "Up Area", the process proceeds to step S44.

In step S43, the communication terminal sets the transmission power control (TPC) bit to indicate that the downlink transmission power needs to be decreased.

Meanwhile, in step S44, the communication terminal sets the transmission power control (TPC) bit to indicate that the downlink transmission power needs to be increased. Here, let us assume that a packet error rate of 1% in the E-HICH corresponds to a packet error rate of 10% in the HS-SCCH, the measured received power of the HS-SCCH is −110 dBm, and the measured packet error rate of the HS-SCCH is 12%. In this case, the coordinate point belongs to the "Up Area" and therefore the communication terminal sets the transmission power control (TPC) bit to indicate that the downlink transmission power needs to be increased.

After step S43 or S44, the process proceeds to step S5.

In step S5 shown in FIGS. 7 and 8, the communication terminal transmits an uplink signal (DPCH) including the transmission power control (TPC) bit set in step S4.

In step S6 shown in FIG. 7, the base station receives the uplink signal from the communication terminal, extracts the transmission power control (TPC) bit from the received uplink signal, and determines the transmission power of the E-HICH according to the TPC bit.

In step S7, the base station transmits the E-HICH with the determined transmission power.

Transmission power of other channels (E-AGCH, E-RGCH, and F-DPCH) without CRC bits may also be determined in a manner similar to the E-HICH. Alternatively, transmission power of other channels (E-AGCH, E-RGCH, and F-DPCH) without CRC bits may be determined based on a predetermined relationship between the TPC bit of the E-HICH and TPC bits of the other channels.

4. Transmission Power Control Based on Error Rate of HS-PDSCH

In the transmission power control method described below, transmission power of a downlink channel such as the E-HICH is controlled based on the error rate of the HS-PDSCH. This method is different from the method <3.> described above in that the HS-PDSCH is used instead of the HS-SCCH.

When transmitting a downlink data channel in a system employing the enhanced uplink scheme for uplink communications, the base station transmits a high-speed physical downlink shared channel (HS-PDSCH) together with a high-speed shared control channel (HS-SCCH). CRC bits are attached to both the HS-SCCH and the HS-PDSCH. The error rate of the HS-PDSCH can be measured based on the CRC bits. The error rate reflects the quality of downlink channels and therefore can be used for transmission power control of a downlink channel such as the E-HICH. However, unlike the CPICH, the transmission power of the HS-PDSCH is not constant. Therefore, when estimating the error rate at the communication terminal, it is necessary to take into account the received power of the HS-PDSCH.

Figure 10:
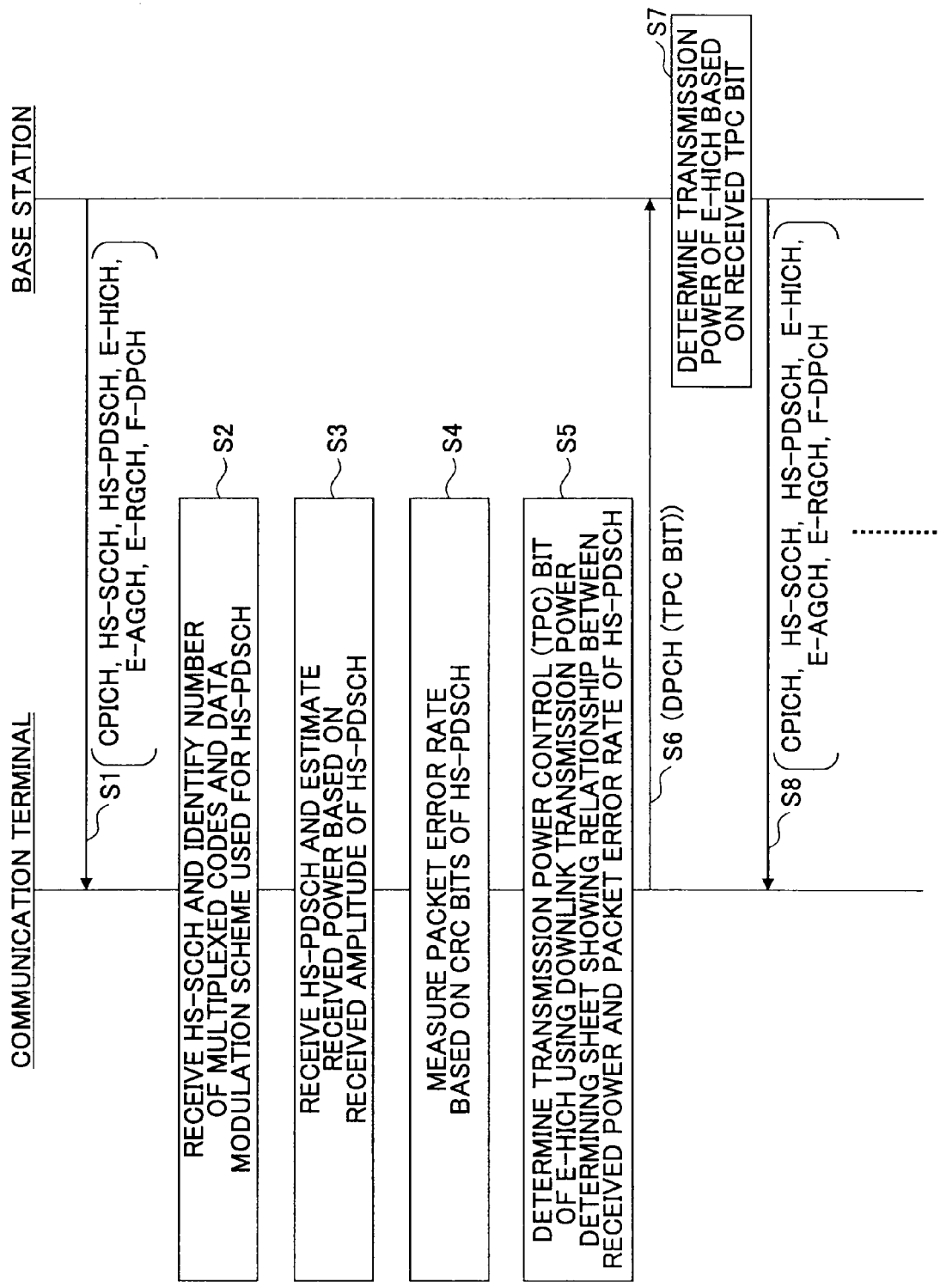
FIG. 10 is a sequence chart showing a transmission power control method using an HS-PDSCH.

FIG. 10 shows a transmission power control method based on an error rate of the HS-PDSCH.

In step S1 shown in FIG. 10, the base station transmits various downlink channels to the communication terminal. However, it is not necessary to transmit all channels shown in FIG. 10 in step S1. In this exemplary method, at least the high-speed shared control channel (HS-SCCH) and the high-speed physical downlink shared channel (HS-PDSCH) are necessary.

In step S2, the communication terminal receives the HS-PDSCH together with the HS-SCCH. The communication terminal analyzes the HS-SCCH to identify the number of multiplexed codes and a data modulation scheme used for the HS-PDSCH.

In step S3, the communication terminal measures the received amplitude of the HS-PDSCH based on the results of analyzing the HS-SCCH and estimates the received power of the HS-PDSCH based on the measured received amplitude.

In step S4, the communication terminal measures an error rate based on the CRC bits of the HS-PDSCH. The error rate may be represented by any appropriate indicator such as a bit error rate, a packet error rate, or a block error rate. For descriptive purposes, it is assumed that a packet error rate is measured in step S4.

Steps S3 and S4 may be performed in the order as shown in FIG. 10 or a part or the whole of step S4 may be performed concurrently with step S3.

In step S5, the communication terminal determines an area in a downlink transmission power determining sheet based on the received power and the packet error rate of the HS-PDSCH measured in steps S3 and S4. The communication terminal also determines the transmission power control (TPC) bit of the E-HICH according to the determined area.

Figure 11:
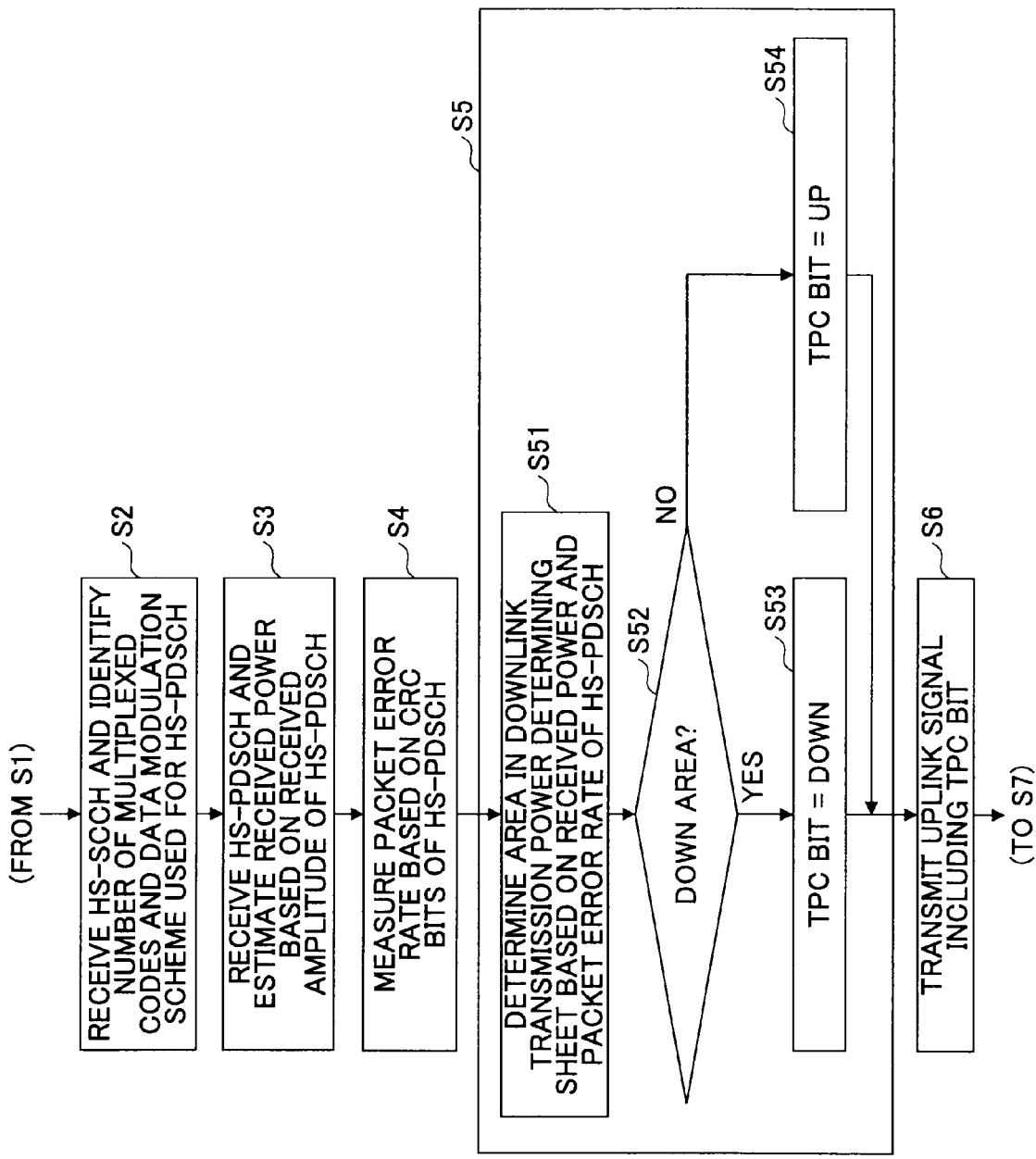
FIG. 11 is a flowchart showing details of step S5 of FIG. 10.

FIG. 11 is a flowchart showing details of step S5 of FIG. 10.

In step S51, the communication terminal determines an area in the downlink transmission power determining sheet based on the measured received power and packet error rate of the HS-PDSCH.

Figure 12:
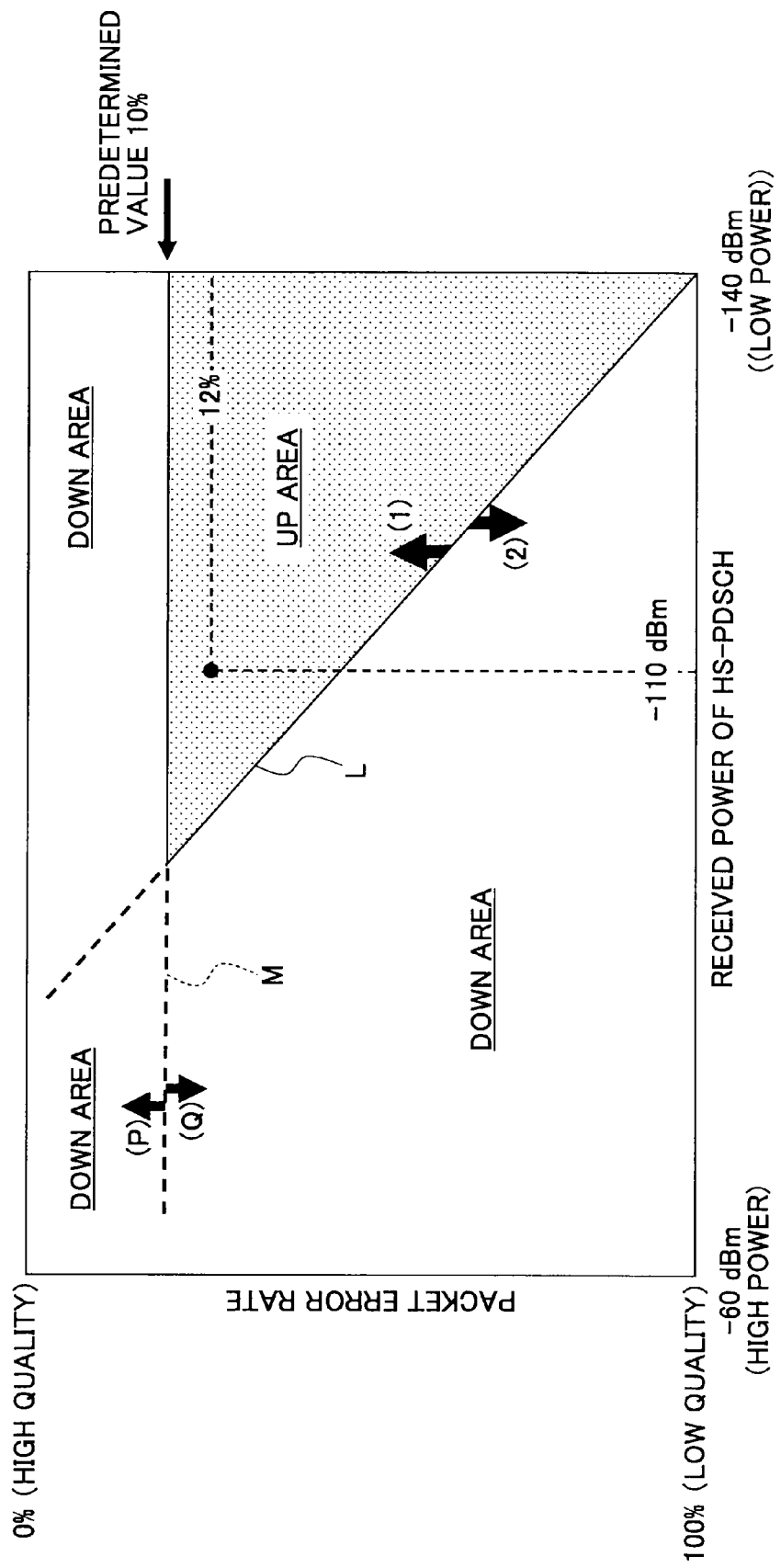
FIG. 12 is a drawing illustrating an example of a downlink transmission power determining sheet.

FIG. 12 shows an example of the downlink transmission power determining sheet. The downlink transmission power determining sheet is, for example, stored in a memory of the communication terminal in advance. Information on the downlink transmission power determining sheet may be provided as system broadcast information or provided for each communication terminal. The downlink transmission power determining sheet is used to determine whether to increase the transmission power of the E-HICH based on the measured received power and packet error rate of the HS-PDSCH. The downlink transmission power determining sheet is a two-dimensional distribution chart (graph) showing a relationship between the received power and the packet error rate of the HS-PDSCH, which reflects a relationship between the received power and the packet error rate of the E-HICH, in association with increase and decrease of the downlink transmission power of the E-HICH. There is a one-to-one relationship between the packet error rate of the HS-PDSCH and the packet error rate of the E-HICH and the relationship can be studied in advance. For example, a packet error rate of 10% in the HS-PDSCH corresponds to a packet error rate of 1% in the E-HICH.

In general, when the measured packet error rate of the HS-PDSCH is less (better) than a predetermined value (e.g., 10%), i.e., belongs to an area (P), it indicates that the reception environment of the communication terminal is excessively good. To efficiently use downlink power resources, it is preferable to decrease the downlink transmission power for the communication terminal when the packet error rate is in the area (P) (when the reception environment is excessively good) and to use the power obtained by decreasing the downlink transmission power for other communication terminals. For this reason, when the measured packet error rate is in the area (P), the TPC bit is set to indicate that the downlink transmission power needs to be decreased. In FIG. 12, to illustrate this approach, the area (P) corresponding to quality levels better than the predetermined value indicated by a line M is labeled as "Down Area".

Meanwhile, there is generally a relationship as indicated by a line L between the received power of the HS-PDSCH and the packet error rate of the HS-PDSCH. Although the line L is exemplified by a straight line in FIG. 12, the line L may take various shapes. When the measured packet error rate is above the line L, i.e., belongs to an area (1), it indicates that the reception environment of the communication terminal is better than average. When the measured packet error rate is greater (worse) than the predetermined value under such an environment, it may be possible to improve the packet error rate by increasing the downlink transmission power. For this reason, when a coordinate point defined by the measured received power and packet error rate of the HS-PDSCH belongs to an overlapping area between an area (Q) below the line M and the area (1) above the line L, the TPC bit is set to indicate that the downlink transmission power needs to be increased. In FIG. 12, to illustrate this approach, an overlapping area between the area (Q) and the area (1) is labeled as "Up Area".

When the measured packet error rate is below the line L, i.e., belongs to an area (2), it indicates that the reception environment of the communication terminal is worse than average. When the measured packet error rate is greater (worse) than the predetermined value under such an environment, it may be necessary to greatly increase the downlink transmission power to improve the packet error rate. In other words, compared with an average reception environment, higher transmission power is necessary to improve the packet error rate. Providing high transmission power for a communication terminal in such a bad reception environment is not preferable for the purpose of efficiently using power resources while improving the system throughput. For this reason, when a coordinate point defined by the measured received power and packet error rate of the HS-PDSCH belongs to an overlapping area between the area (Q) below the line M and the area (2) below the line L, the TPC bit is set to indicate that the downlink transmission power needs to be decreased. In FIG. 12, to illustrate this approach, the overlapping area between the area (Q) and the area (2) is labeled as "Down Area".

In step S52 of FIG. 11, the communication terminal determines whether a coordinate point defined by the received power and the packet error rate of the HS-PDSCH measured in steps S3 and S4 belongs to the "Down Area" in the downlink transmission power determining sheet shown in FIG. 12. If the coordinate point belongs to the "Down Area", the process proceeds to step S53. If the coordinate point does not belong to the "Down Area", i.e., if the coordinate point belongs to the "Up Area", the process proceeds to step S54.

In step S53, the communication terminal sets the transmission power control (TPC) bit to indicate that the downlink transmission power needs to be decreased.

Meanwhile, in step S54, the communication terminal sets the transmission power control (TPC) bit to indicate that the downlink transmission power needs to be increased. Here, let us assume that a packet error rate of 1% in the E-HICH corresponds to a packet error rate of 10% in the HS-PDSCH, the measured received power of the HS-PDSCH is −110 dBm, and the measured packet error rate of the HS-PDSCH is 12%. In this case, the coordinate point belongs to the "Up Area" and therefore the communication terminal sets the transmission power control (TPC) bit to indicate that the downlink transmission power needs to be increased.

After step S53 or S54, the process proceeds to step S6.

In step S6 shown in FIGS. 10 and 11, the communication terminal transmits an uplink signal (DPCH) including the transmission power control (TPC) bit set in step S5.

In step S7 shown in FIG. 10, the base station receives the uplink signal from the communication terminal, extracts the transmission power control (TPC) bit from the received uplink signal, and determines the transmission power of the E-HICH according to the TPC bit.

In step S8, the base station transmits the E-HICH with the determined transmission power.

Transmission power of other channels (E-AGCH, E-RGCH, and F-DPCH) without CRC bits may also be determined in a manner similar to the E-HICH. Alternatively, transmission power of other channels (E-AGCH, E-RGCH, and F-DPCH) without CRC bits may be determined based on a predetermined relationship between the TPC bit of the E-HICH and TPC bits of the other channels.

5. Transmission Power Control Based on Detection Result of E-HICH

The enhanced-dedicated channel hybrid ARQ indicator channel (E-HICH) is transmitted from the base station to the communication terminal after a predetermined period of time from when the enhanced-dedicated physical data channel (E-DPDCH) is transmitted from the communication terminal to the base station. Each time after the E-DPDCH is transmitted via uplink, the E-HICH is transmitted via downlink. The downlink transmission timing of the E-HICH is predefined in the system. Therefore, the communication terminal can estimate whether the E-HICH has been properly transmitted from the base station by determining whether the E-HICH is properly received after transmitting the E-DPDCH. Accordingly, it is possible to control the transmission power of the E-HICH based on the estimation result.

In the transmission power control method described below, transmission power of a downlink channel such as the E-HICH is controlled based on the detection rate of the E-HICH.

Figure 13:
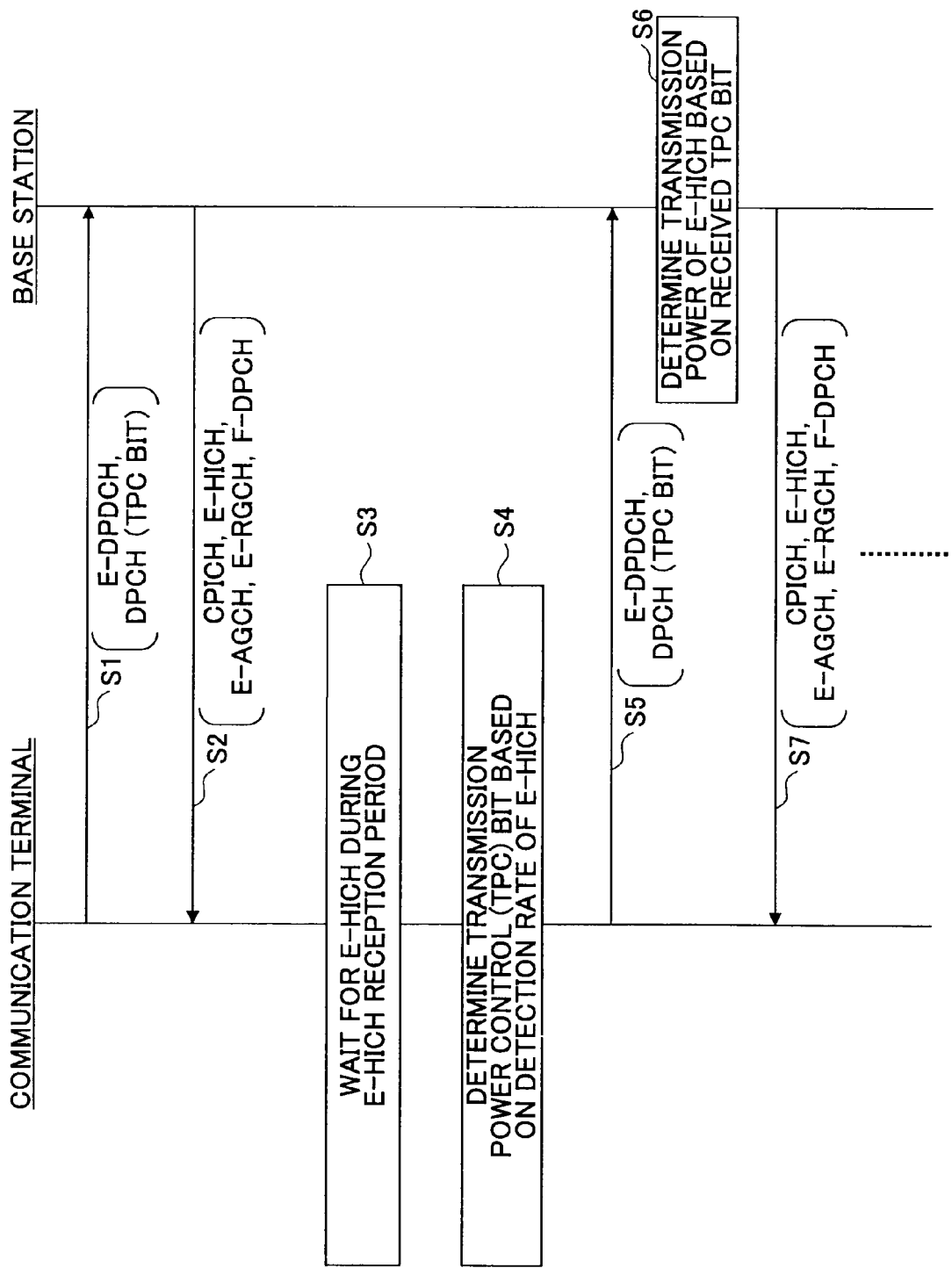
FIG. 13 is a sequence chart showing a transmission power control method based on a detection result of an E-HICH.

FIG. 13 shows a transmission power control method based on a detection result of the E-HICH.

In step S1 shown in FIG. 13, the communication terminal transmits a data channel (E-DPDCH) to the base station. If needed, the communication terminal also transmits a transmission power control (TPC) bit for a downlink channel to the base station.

In step S2, the base station transmits various downlink channels to the communication terminal. However, it is not necessary to transmit all channels shown in FIG. 13 in step S2. In this exemplary method, at least the E-HICH indicating acknowledgement information for the uplink data channel (E-DPDCH) is necessary.

In step S3, the communication terminal waits for the E-HICH. If the communication conditions are good, the communication terminal can receive the E-HICH after a predetermined period of time from when the data channel (E-DPDCH) is transmitted (the predetermined period of time may be called an E-HICH reception period). In other words, in step S3, the communication terminal measures a detection rate of the E-HICH. The detection rate is obtained, for example, based on multiple detection (reception) results of the E-HICH.

In step S4, the communication terminal determines the transmission power control (TPC) bit for downlink transmission power of the E-HICH based on the detection rate of the E-HICH measured in step S3.

Figure 14:
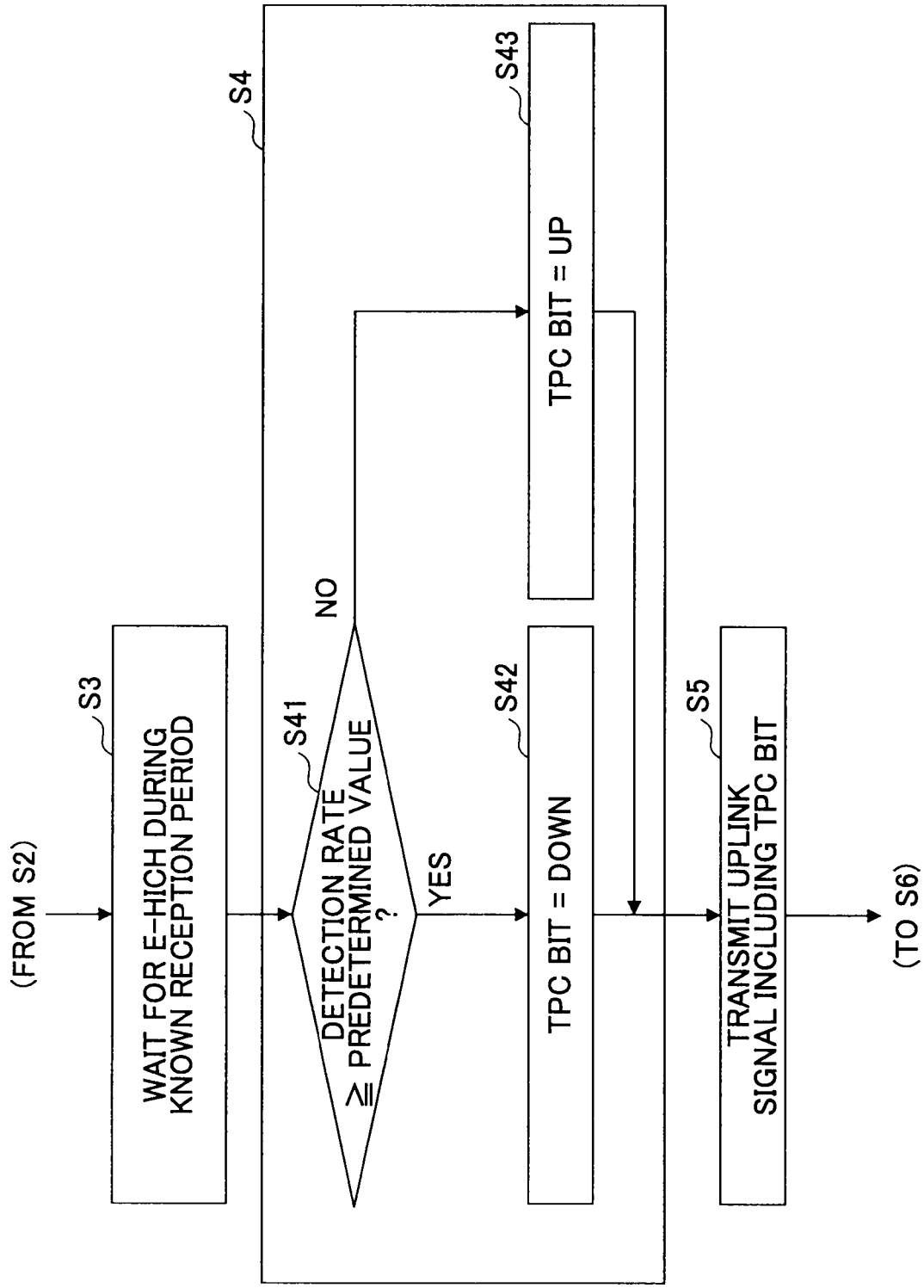
FIG. 14 is a flowchart showing details of step S4 of FIG. 13.

FIG. 14 is a flowchart showing details of step S4 of FIG. 13.

In step S41, the communication terminal determines whether the detection rate of the E-HICH is greater than or equal to a predetermined value. In other words, the communication terminal determines whether the E-HICH has been properly detected in step S3. If the detection rate of the E-HICH is greater than or equal to the predetermined value, the process proceeds to step S42. If the detection rate of the E-HICH is less than the predetermined value, i.e., if the E-HICH has not been properly transmitted, the process proceeds to step S43.

In step S42, the communication terminal sets the transmission power control (TPC) bit to indicate that the downlink transmission power needs to be decreased.

Meanwhile, in step S43, the communication terminal sets the transmission power control (TPC) bit to indicate that the downlink transmission power needs to be increased.

After step S42 or S43, the process proceeds to step S5.

In step S5 shown in FIGS. 13 and 14, the communication terminal transmits an uplink signal (DPCH) including the transmission power control (TPC) bit set in step S4.

In step S6 shown in FIG. 13, the base station receives the uplink signal from the communication terminal, extracts the transmission power control (TPC) bit from the received uplink signal, and determines the transmission power of the E-HICH according to the TPC bit.

In step S7, the base station transmits the E-HICH with the determined transmission power.

Transmission power of other channels (E-AGCH, E-RGCH, and F-DPCH) without CRC bits may also be determined in a manner similar to the E-HICH. Alternatively, transmission power of other channels (E-AGCH, E-RGCH, and F-DPCH) without CRC bits may be determined based on a predetermined relationship between the TPC bit of the E-HICH and TPC bits of the other channels.

6. Communication Terminal

Figure 15:
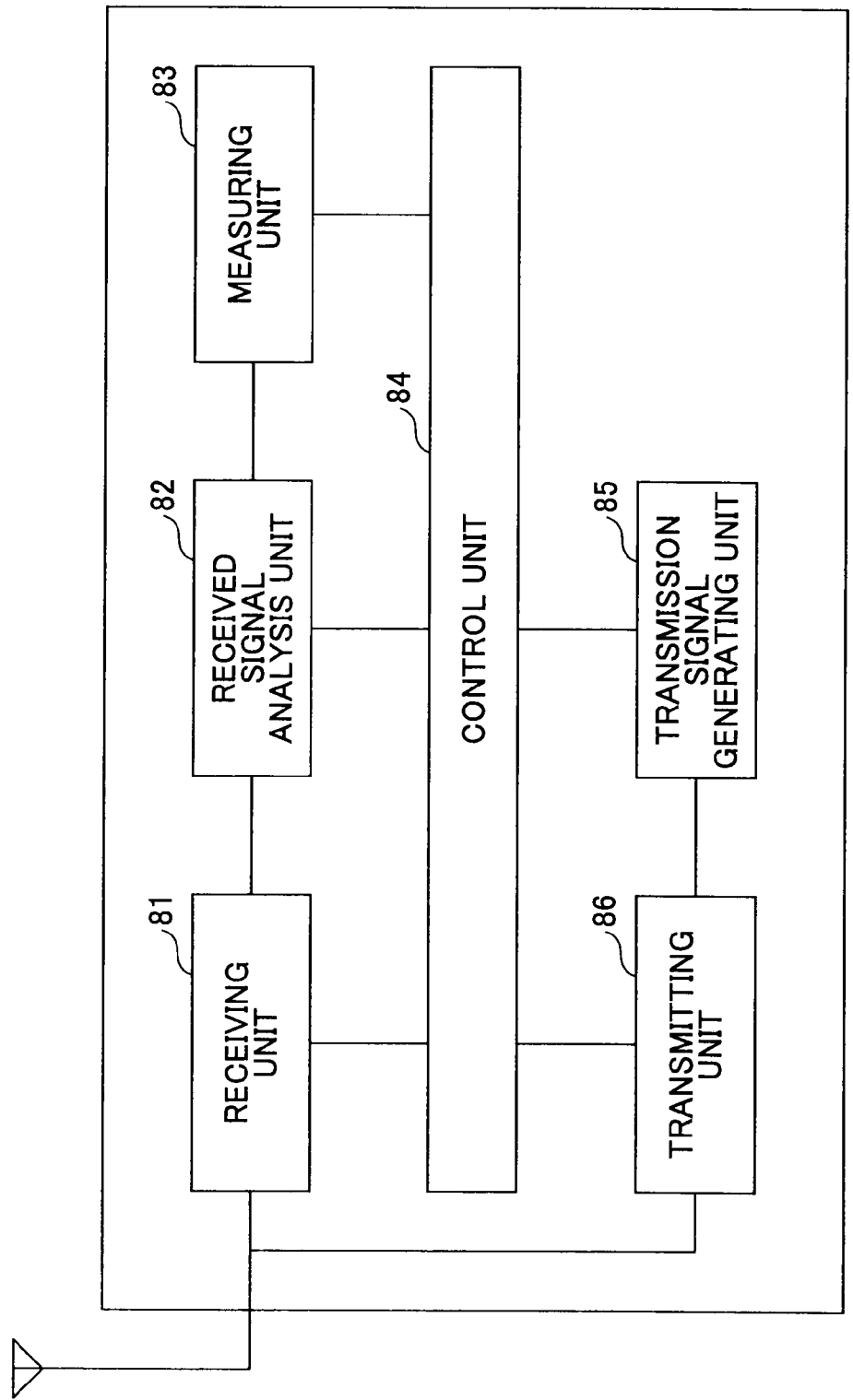
FIG. 15 is a functional block diagram of a communication terminal according to an embodiment of the present invention.

FIG. 15 shows a communication terminal according to an embodiment of the present invention. The communication terminal shown in FIG. 15 includes a receiving unit 81, a received signal analysis unit 82, a measuring unit 83, a control unit 84, a transmission signal generating unit 85, and a transmitting unit 86.

The receiving unit 81 receives a signal from the base station and converts the received signal into a baseband signal.

The received signal analysis unit 82 extracts various signals from the (baseband) received signal and analyzes the extracted signals. As described above, the received signal, for example, includes one or more of the CPICH, the HS-SCCH, the HS-PDSCH, the E-HICH, the E-AGCH, the E-RGCH, and the F-DPCH.

The measuring unit 83 measures the received power and the received quality of the downlink channels. For example, the measuring unit 83 measures the received power and the bit error rate of the CPICH, the received power and the packet error rate of the HS-SCCH, the received power and the packet error rate of the HS-PDSCH, and the detection rate of the E-HICH.

The control unit (determining unit) 84 controls other components of the communication terminal. Particularly, the control unit 84 determines (sets) the TPC bit of the E-HICH based on measurements from the measuring unit 83.

The transmission signal generating unit 85 generates a baseband transmission signal. Particularly, the transmission signal generating unit generates an uplink signal (DPCH) including the TPC bit determined by the control unit 84.

The transmitting unit 86 converts the baseband transmission signal into a radio signal and transmits the radio signal to the base station.

7. Base Station

Figure 16:
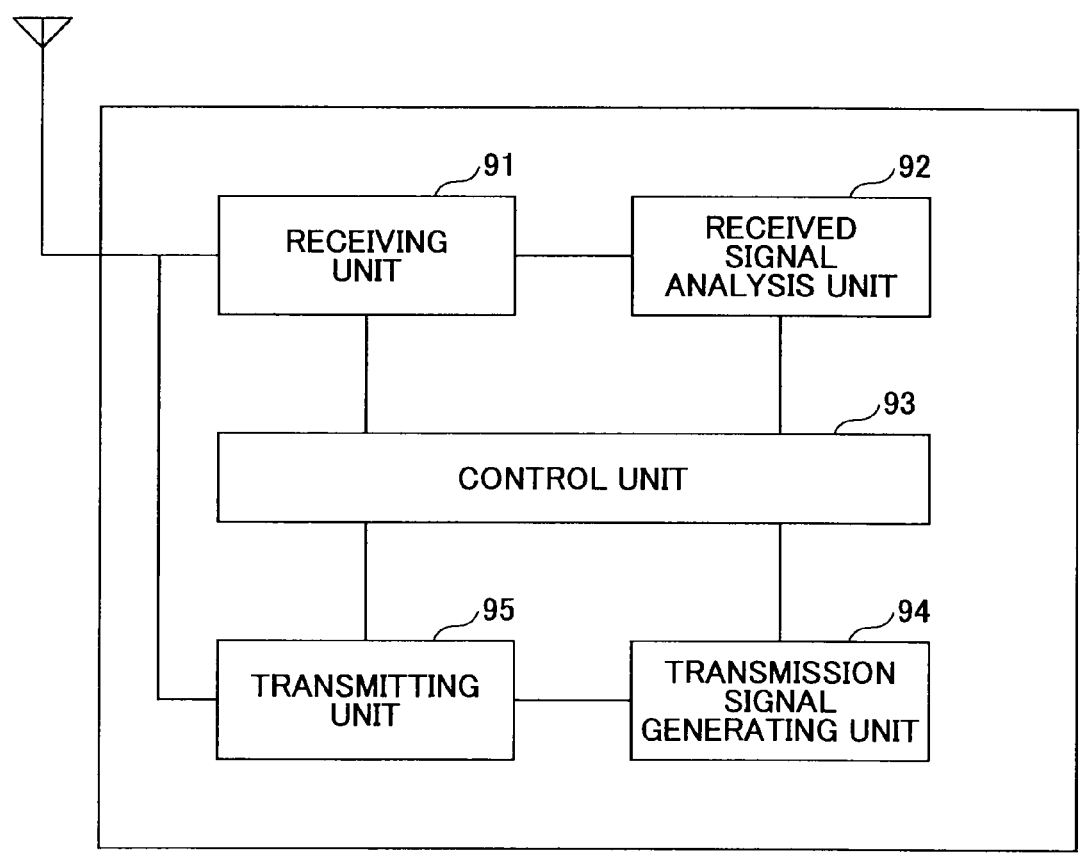
FIG. 16 is a functional block diagram of a base station according to an embodiment of the present invention.

FIG. 16 shows a base station according to an embodiment of the present invention. The base station shown in FIG. 16 includes a receiving unit 91, a received signal analysis unit 92, a control unit 93, a transmission signal generating unit 94, and a transmitting unit 95.

The receiving unit 91 receives an uplink signal from the communication terminal and converts the received signal into a baseband signal.

The received signal analysis unit 92 extracts various signals from the (baseband) received signal and analyzes the extracted signals. As described above, the received signal, for example, includes the E-DPDCH and the DPCH (TPC bit).

The control unit 93 controls other components of the base station. Particularly, the control unit 93 determines transmission power of the E-HICH based on the TPC bit for the E-HICH in the received signal. As needed, the control unit 93 may also determine transmission power of other downlink control channels without CRC bits such as the E-AGCH, the E-RGCH, and the F-DPCH.

The transmission signal generating unit 94 generates a baseband transmission signal. As described above, the transmission signal, for example, includes one or more of the CPICH, the HS-SCCH, the HS-PDSCH, the E-HICH, the E-AGCH, the E-RGCH, and the F-DPCH.

The transmitting unit 95 converts the baseband transmission signal into a radio signal and transmits the radio signal to the communication terminal.

8. Variations

As described above, transmission power control for downlink control channels without cyclic redundancy check (CRC) bits may be performed based on various criteria. The methods <2.> through <5.> may be used individually or in combination. For example, timings at which the CPICH is received are predefined in the system. Therefore, the method <1.> using the bit error rate of the CPICH may be regularly performed at the predefined reception timings. Meanwhile, the methods using the HS-SCCH and the HS-PDSCH can be used only when a downlink data channel is present. Therefore, the methods <2.> and <3.> may be performed when a downlink data channel is received. The method based on the detection result of the E-HICH can be used only after an uplink data channel is transmitted. Therefore, the method <5.> may be performed when an uplink data channel is transmitted. Two or more of the methods <2.> through <5.> may be selectively used according to communications being performed. For example, it is possible to regularly use the method <2.> using the CPICH and to use the method <2.> and/or the method <3.> when a downlink data channel is received. As another example, it is possible to regularly use the method <2.> using the CPICH and to use the method <5.> when an uplink data channel is transmitted.

Thus, embodiments of the present invention make it possible to properly perform transmission power control for downlink control channels without cyclic redundancy check (CRC) bits by using one or more of a bit error rate of the CPICH, an error rate of the downlink HS-SCCH, an error rate of the HS-PDSCH, and a detection result of the E-HICH.

The present invention may be applied to any appropriate radio communication system that allocates transmission power to control channels without CRC bits. For example, the present invention may be applied to an HSDPA/HSUPA W-CDMA system, an LTE system, an IMT-Advanced system, a WiMAX system, and a Wi-Fi system.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Also, a subject matter described in one embodiment may be applied to a subject matter in another embodiment unless they are contradictory. Although functional block diagrams are used to describe apparatuses in the above embodiments, the apparatuses may be implemented by hardware, software, or a combination of them.

Software may be stored in any appropriate storage medium such as a random access memory (RAM), a flash memory, a read only memory (ROM), an EPROM, an EEPROM, a register, a hard disk (HD), a removable disk, or a CD-ROM.

The present application is based on Japanese Priority Application No. 2009-108519, filed on Apr. 27, 2009, the entire contents of which are hereby incorporated herein by reference.

What is claimed is:

1. A communication method performed by a communication terminal for a radio communication system employing an enhanced uplink scheme, the method comprising the steps of:
   determining a transmission power control bit for controlling transmission power of an indicator channel indicating acknowledgement or negative acknowledgement for an uplink data channel;
   generating an uplink control signal including the transmission power control bit; and
   transmitting the uplink control signal to a base station,
   wherein in the determining step, whether the indicator channel is receivable at a quality level better than a predetermined value is evaluated based on reception quality of a downlink channel whose content is known both to the base station and the communication terminal or reception quality of a downlink channel including error detection bits, and the transmission power control bit of the indicator channel is determined based on a result of the evaluation.

2. The communication method as claimed in claim 1, further comprising the steps of:
   measuring reception quality of a pilot channel; and
   estimating reception quality of the indicator channel based on the measured reception quality of the pilot channel and a known relationship between the reception quality of the pilot channel and the reception quality of the indicator channel,
   wherein in the determining step, whether the indicator channel is receivable at the quality level better than the predetermined value is determined based on the estimated reception quality of the indicator channel.

3. The communication method as claimed in claim 1, further comprising the step of:
   measuring received power and reception quality of a downlink channel including error detection bits,
   wherein in the determining step, whether to increase transmission power of the indicator channel is determined based on the measured received power and reception quality of the downlink channel and a known relationship between the received power and the reception quality of the downlink channel.

4. The communication method as claimed in claim 3, wherein in the determining step, whether to increase the transmission power of the indicator channel is determined based on whether the measured reception quality of the downlink channel is within a predetermined range; and
   in the known relationship, the predetermined range becomes wider as the received power of the downlink channel becomes lower.

5. The communication method as claimed in claim 1, wherein a relationship between the transmission power control bit of the indicator channel and a transmission power control bit of another downlink control channel including no error detection bit is known.

6. A communication terminal for a radio communication system employing an enhanced uplink scheme, the communication terminal comprising:

a determining unit configured to determine a transmission power control bit for controlling transmission power of an indicator channel indicating acknowledgement or negative acknowledgement for an uplink data channel;

a generating unit configured to generate an uplink control signal including the transmission power control bit; and a transmitting unit configured to transmit the uplink control signal to a base station, wherein the determining unit is configured to evaluate whether the indicator channel is receivable at a quality level better than a predetermined value based on reception quality of a downlink channel whose content is known both to the base station and the communication terminal or reception quality of a downlink channel including error detection bits, and to determine the transmission power control bit of the indicator channel based on the evaluation result.

* * * * *